United States Patent
Matthaei et al.

(10) Patent No.: US 11,945,425 B2
(45) Date of Patent: Apr. 2, 2024

(54) METHOD FOR BRAKING A VEHICLE FOR CARRYING PASSENGERS, CONTROL UNIT, AND VEHICLE FOR CARRYING PASSENGERS

(71) Applicant: ZF CV Systems Global GmbH, Bern (CH)

(72) Inventors: Richard Matthaei, Hameln (DE); Thomas Dieckmann, Pattensen (DE); Waldemar Kamischke, Neustadt (DE); Janik Ricke, Uetze (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 0 days.

(21) Appl. No.: 17/795,239

(22) PCT Filed: Feb. 14, 2020

(86) PCT No.: PCT/EP2020/053929
§ 371 (c)(1),
(2) Date: Jul. 26, 2022

(87) PCT Pub. No.: WO2021/160287
PCT Pub. Date: Aug. 19, 2021

(65) Prior Publication Data
US 2023/0068079 A1 Mar. 2, 2023

(51) Int. Cl.
*B60T 7/12* (2006.01)
*B60T 7/22* (2006.01)
(Continued)

(52) U.S. Cl.
CPC ...... *B60T 7/12* (2013.01); *B60T 7/22* (2013.01); *B60T 8/171* (2013.01);
(Continued)

(58) Field of Classification Search
CPC ..... B60T 7/12; B60T 7/22; B60T 8/171; B60T 8/17558; B60T 2201/022; B60T 2201/12;
(Continued)

(56) References Cited

U.S. PATENT DOCUMENTS 5,567,024 A * 10/1996 Johnson ............. B60T 8/5006
303/158
6,234,584 B1  5/2001 Stumpe et al.
(Continued)

FOREIGN PATENT DOCUMENTS

DE    19633834 A1   2/1998
DE   102008045481 A1  5/2009
(Continued)

*Primary Examiner* — Edwin A Young
(74) *Attorney, Agent, or Firm* — LEYDIG, VOIT & MAYER, LTD.

(57) ABSTRACT

A method for braking a vehicle, including checking whether a trigger criterion for braking the vehicle is present, and if the trigger criterion is satisfied, causing a conditioning braking pulse through brief pulsed braking such that passengers experience brief braking of the vehicle, and immediately thereafter initiating a braking phase in which the vehicle is braked in at least two partial braking regions by an actual ego deceleration that varies with respect to time, wherein each partial braking region is extended over a partial braking interval and merge into one another without the actual ego deceleration changing abruptly, and the actual ego deceleration in at least one of the partial braking regions is changed continuously over the respective partial braking interval such that a different actual jerk is obtained in each partial braking region, and wherein the actual jerk behaves degressively over at least some partial braking regions.

23 Claims, 4 Drawing Sheets

(51) Int. Cl.
*B60T 8/171* (2006.01)
*B60T 8/1755* (2006.01)
*B60W 10/10* (2012.01)
*B60W 10/184* (2012.01)
*B60W 30/09* (2012.01)

(52) U.S. Cl.
CPC ......... *B60T 8/17558* (2013.01); *B60W 10/10* (2013.01); *B60W 10/184* (2013.01); *B60W 30/09* (2013.01); *B60T 2201/022* (2013.01); *B60T 2201/12* (2013.01); *B60T 2210/10* (2013.01); *B60T 2210/32* (2013.01); *B60T 2250/00* (2013.01); *B60T 2250/04* (2013.01); *B60W 2520/10* (2013.01); *B60W 2520/105* (2013.01); *B60W 2540/01* (2020.02); *B60W 2552/00* (2020.02); *B60W 2710/10* (2013.01); *B60W 2710/18* (2013.01)

(58) Field of Classification Search
CPC ............ B60T 2210/10; B60T 2210/32; B60T 2250/00; B60T 2250/04; B60W 10/10; B60W 10/184; B60W 30/09; B60W 2540/01; B60W 2552/00; B60W 2520/10; B60W 2520/105; B60W 2710/10; B60W 2710/18

See application file for complete search history.

(56) References Cited

U.S. PATENT DOCUMENTS

| | | | |
|---|---|---|---|
| 2011/0054756 A1* | 3/2011 | Hecker | B60T 17/22 701/70 |
| 2016/0121863 A1 | 5/2016 | Kim | |
| 2018/0053419 A1* | 2/2018 | Kiefer | H04W 4/44 |
| 2021/0197864 A1 | 7/2021 | Oltmann et al. | |

FOREIGN PATENT DOCUMENTS

| | | |
|---|---|---|
| DE | 102014008431 A1 | 11/2014 |
| DE | 102015013855 A1 | 5/2016 |
| DE | 102018004303 B3 | 11/2019 |
| EP | 0894684 A2 | 2/1999 |
| EP | 2388757 B1 | 8/2017 |
| EP | 2407358 B1 | 5/2018 |
| EP | 3326874 A1 | 5/2018 |

* cited by examiner

METHOD FOR BRAKING A VEHICLE FOR CARRYING PASSENGERS, CONTROL UNIT, AND VEHICLE FOR CARRYING PASSENGERS

CROSS REFERENCE TO RELATED APPLICATIONS

This application is a U.S. National Phase application under 35 U.S.C. § 371 of International Application No. PCT/EP2020/053929, filed on Feb. 14, 2020. The International Application was published in German on Aug. 19, 2021 as WO 2021/160287 A1 under PCT Article 21(2).

FIELD

The invention relates to a method for braking a vehicle for carrying passengers, in particular a road vehicle for carrying passengers who are standing and/or not strapped in, for example a bus, and to a control device and a vehicle for carrying passengers, in particular a bus.

BACKGROUND

It is known from the prior art to brake vehicles in a cascade consisting of a visual and acoustic warning, a haptic warning in the form of a partial braking operation that can be felt by the strapped-in driver, and a subsequent emergency braking phase. In DE 10 2008 045 481 A1, a certain actual ego deceleration for the vehicle is set during the partial braking operation in the haptic warning phase, wherein the actual ego deceleration increases continuously in time with a certain actual jerk, with the result that there is also a continuously increasing actual ego deceleration for the vehicle. In the emergency braking phase, the vehicle is then braked to a standstill with a constant emergency braking deceleration, wherein the actual ego deceleration increases abruptly between the haptic warning phase and the emergency braking phase. In emergency braking situations, the vehicle can thereby be decelerated efficiently with several warnings to the strapped-in driver and, at the same time, a collision can be avoided or consequences of a collision can be reduced.

EP 2 407 358 B1 furthermore describes that, when a warning condition is present as a trigger criterion for braking the vehicle in the context of emergency braking, first of all brief, jerky braking of the vehicle takes place, wherein the vehicle is braked briefly with a jerk which can be felt by the strapped-in driver owing to the jerky braking. In this case, this serves as a haptic warning to the strapped-in driver before the actual braking phase. Subsequently, the braking phase is initiated, in which the vehicle is braked by means of a braking system, preferably to a standstill, by a setpoint ego deceleration, which varies with respect to time, in the form of two stages in two partial braking regions, in order to avoid a collision.

Further braking methods for avoiding collisions are described in EP 2 388 757 B1 and EP 3 326 874 A1.

For a vehicle in which there are normally passengers who are standing and/or not strapped in, for example a bus, this conventional cascade is not always expedient with regard to the safety of these passengers. Particularly in braking situations for collision avoidance, this cascade must therefore be adapted in a manner appropriate to this situation.

For this purpose, it is disclosed in DE 10 2014 008 431 A1, when there is a probability of a collision, to first warn the driver of a bus visually and/or acoustically and then to brake the bus automatically in a braking phase by setting a velocity-dependent actual ego deceleration, thereby once again alerting the driver to the collision avoidance measure. In this case, an abrupt jump to a velocity-dependent actual ego deceleration perceptible by the driver is made at the beginning of the braking phase. Starting from this, a continuous increase of the actual ego deceleration can then take place up to a maximum deceleration which corresponds to approximately half of an emergency braking deceleration. A subsequent emergency braking phase does not take place in order to avoid endangering the passengers.

It is disadvantageous in known methods that the passengers of the vehicle may fall in the event of an abrupt or sudden rise in the actual ego deceleration since this abrupt rise is matched to a haptic warning to the strapped-in driver and the passengers are often not holding on to the intended holding points and/or are distracted. Thus, if an abrupt increase in the actual ego deceleration is requested in the braking phase in order to warn the strapped-in driver or to bring the vehicle to a standstill as quickly as possible, this can lead to dangerous consequential situations for the passengers.

SUMMARY

In an embodiment, the present disclosure provides a method for braking a vehicle for carrying passengers, comprising checking whether a trigger criterion for braking the vehicle for carrying passengers is present, and if the trigger criterion is satisfied, causing a conditioning braking pulse through brief pulsed braking of the vehicle such that the passengers in the vehicle experience brief braking of the vehicle, and immediately thereafter initiating a braking phase, wherein, in the braking phase, the vehicle is braked using a braking system in at least two partial braking regions by an actual ego deceleration that varies with respect to time, wherein each partial braking region is extended over a partial braking interval, wherein the partial braking regions merge into one another without the actual ego deceleration changing abruptly, and the actual ego deceleration in at least one of the partial braking regions is changed continuously over the respective partial braking interval such that a different actual jerk is obtained in each partial braking region, and wherein the actual jerk behaves degressively over at least some partial braking regions of the braking phase.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
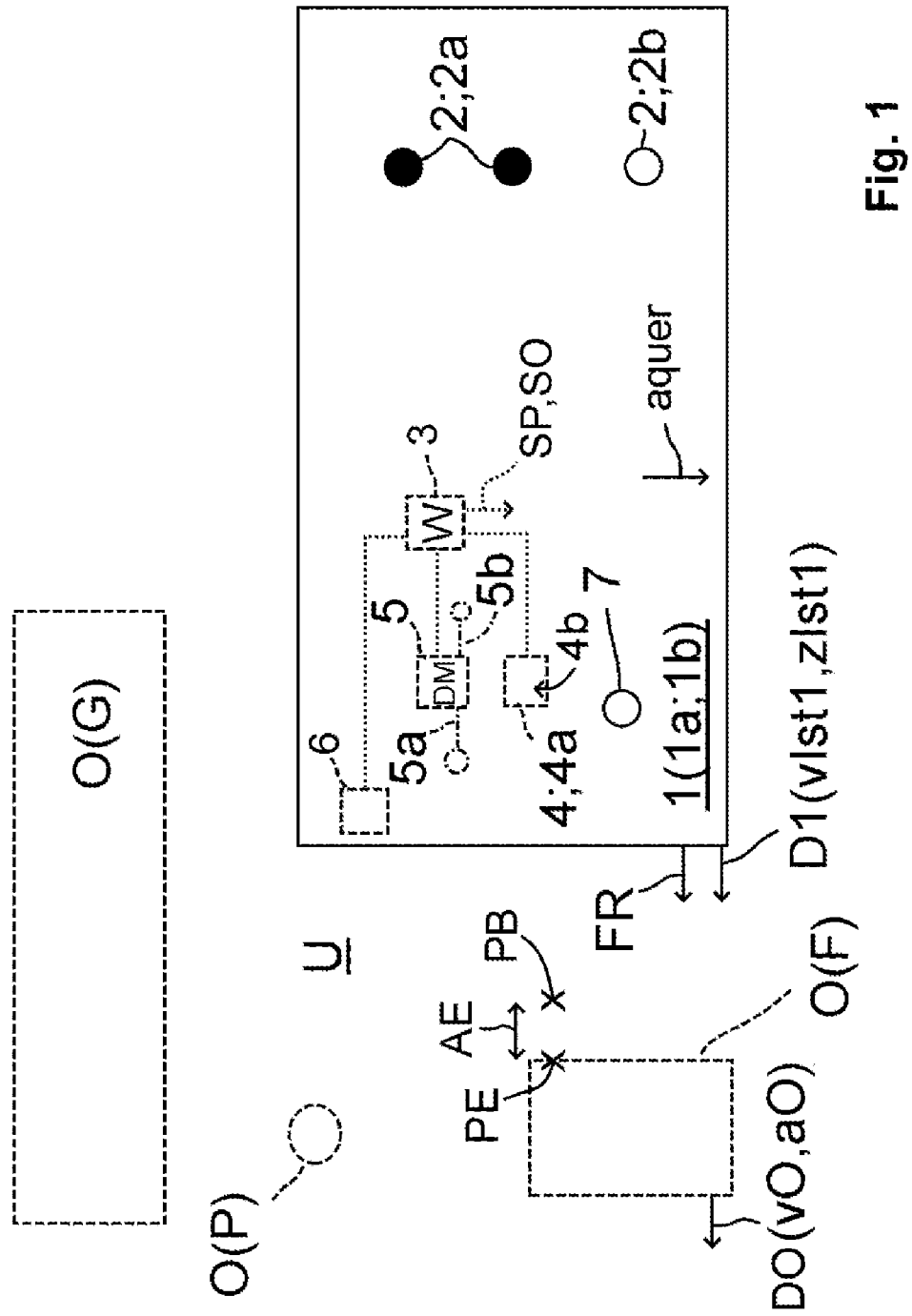
FIG. 1 shows a schematic view of a vehicle with several passengers.

In an embodiment of the invention, a method is provided with which a vehicle for carrying passengers, in particular passengers who are standing and/or not strapped in in a road vehicle, can be braked safely and reliably and with which increased safety for the passengers can be ensured at the same time. In some embodiments, a control unit and a vehicle for carrying passengers is disclosed.

According to an embodiment of the invention, it is accordingly envisaged that, when a trigger criterion is satisfied, a conditioning braking pulse is brought about through brief pulsed braking of the vehicle in such a way that the passengers in the vehicle experience brief time-limited braking of the vehicle, and a braking phase is initiated immediately after the conditioning braking pulse. In this context, immediately thereafter means that the braking phase immediately follows the conditioning braking pulse, or the conditioning braking pulse merges directly into the braking phase, preferably in such a way that the actual ego deceleration does not change abruptly or suddenly between the conditioning braking pulse and the braking phase. In this context, the actual ego deceleration is understood to mean the deceleration of the vehicle in the longitudinal direction or in the direction of travel.

This can be accomplished, for example, by initiating the braking phase directly from the falling flank of the conditioning braking pulse, with the result that the conditioning braking pulse merges directly into the braking phase at an actual ego deceleration of, for example, between 0.1 m/s$^2$ and 2 m/s$^2$, preferably at between 0.5 m/s$^2$ and 1.5 m/s$^2$, in particular at 1 m/s$^2$.

In the subsequent braking phase, the vehicle is braked in at least two partial braking regions by an actual ego deceleration, which varies with respect to time, by means of any braking system. In this case, any system in the vehicle which is capable of decelerating the vehicle in a controlled manner in accordance with a request can be used as the braking system. For this purpose, the braking system can have, for example, an engine brake, a recuperative brake (regenerative brake), a retarder, friction brakes, etc., as a braking means. In the context of the invention, braking is therefore generally understood to mean deceleration of the vehicle using the respective braking system or the respective braking means to bring about the conditioning braking pulse or to implement the braking phase.

Here, a partial braking region is extended over a partial braking interval and is characterized in that, within this partial braking interval, there is a constant actual jerk or a constant change in the actual ego deceleration. In this case, two delimitable partial braking regions within the braking phase which follow one another and have an identical actual jerk are to be regarded as equivalent to a single partial braking region. If, on the other hand, the actual jerk changes, then an adjacent partial braking region begins with a correspondingly different constant actual jerk, etc.

According to an embodiment of the invention, provision is made here for the actual ego deceleration in at least one of the partial braking regions to be changed continuously over the respective partial braking interval in such a way that a different actual jerk or a different constant change in the actual ego deceleration is obtained in each partial braking region. Accordingly, there are no partial braking regions with the same actual jerk in the braking phase in which the vehicle is braked. As a further condition, it is envisaged according to an embodiment of the invention that the actual jerk behaves degressively over at least some partial braking regions of the braking phase, preferably over all the partial braking regions of the braking phase, i.e. decreases between adjacent partial braking regions as time progresses.

Provision is furthermore made for the partial braking regions with the respectively different actual jerk to merge into one another without the actual ego deceleration changing abruptly or suddenly, with the result that the actual ego deceleration has a steady course over time, at least in the braking phase.

By means of the braking according to an embodiment of the invention with the conditioning braking pulse and the immediately following braking phase, the advantage is already achieved that as far as possible the passengers do not fall over or still have a chance of holding on. Standing passengers in vehicles, in particular buses, are in fact often distracted or do not hold on to the available holding points in an appropriate manner. By means of the conditioning braking pulse, the passengers can be conditioned in a first step, in which case they thereupon tense their muscles and possibly also take a sidestep in order to increase their stability for the subsequent braking phase, and may also hold on more tightly.

The conditioning braking pulse thus generates a preparation reaction in the passengers at the beginning of the imminent braking process, and this allows higher actual ego decelerations in the subsequent braking phase than without this reaction, since the passengers are prepared or conditioned for this. The safety of the passengers is thus increased as a result, and the subsequent braking can be designed differently.

In addition, the braking process is more manageable and therefore safer overall for the passengers since the braking takes place in a plurality of partial braking regions which merge into one another without an abrupt change in the actual ego deceleration, thus ensuring that the initial inattentiveness can be further compensated and the passengers can therefore adjust themselves deliberately to the braking process. Excessive swaying of the passengers can thereby be avoided.

The prerequisite for the absence of any abrupt change in the actual ego deceleration in the braking phase is to be understood here as meaning that the actual jerk in the braking phase is less than, for example, 2 m/s$^3$, preferably less than 1.7 m/s$^3$, in particular less than 1.25 m/s$^3$. Accordingly, after the deliberate conditioning of the passengers by means of the conditioning braking pulse, any jerky deceleration changes of the vehicle and thus behavior of the vehicle which is unpredictable and unmanageable for the passengers should be avoided.

For this purpose, provision can preferably additionally be made for the vehicle to be braked only by means of the friction brakes of the respective braking system, at least in the braking phase, and, to achieve this, no torque is transmitted between an input drive train of the vehicle and an output drive train of the vehicle, and/or a non-positive connection is interrupted, at least in the braking phase, a transmission of the vehicle preferably being disengaged or shifted into the neutral position for this purpose.

In the case of braking by means of the friction brakes, it is thereby possible to avoid jerky drag torques of the engine due to shifting processes or engine braking, which would likewise contribute to abrupt braking or an abrupt change in the actual ego deceleration of the vehicle. By this means too, it is therefore possible to achieve the single goal of a change in the actual ego deceleration which is as smooth as possible.

However, even when other braking means are used, for example a recuperation brake, provision can advantageously be made for activation of some other braking means of the vehicle to be suppressed in order to avoid unmanageable, abrupt influences on the actual ego deceleration.

In addition, any other external braking requests (XBR) are advantageously also suppressed, ensuring that the vehicle is also not decelerated abruptly in the braking phase in an uncontrolled manner by further braking means, for example a retarder, and thus an unwanted change in the actual deceleration in the braking phase is avoided.

Furthermore, degressive behavior has the advantage that the passengers have to hold on very tightly right at the beginning and are additionally warned of an emergency situation or a braking situation. Since the braking subsequently increases in a degressive manner, possible unstable states of the passengers can be anticipated better since the deceleration does not increase even more quickly. As a result, the braking process is more manageable and therefore safer overall for the passengers.

For this purpose, provision can preferably be made for the actual ego deceleration in at least some partial braking regions of the braking phase to be set in such a way that the actual jerk of a subsequent partial braking region corresponds to a proportion of the actual jerk of the immediately preceding partial braking region, wherein the proportion is between 0.4 (40%) and 0.6 (60%), preferably 0.5 (50%). Given the specification of an actual jerk for the first partial braking region of the braking phase, this makes it a simple matter to determine the respective actual jerk of the respective subsequent partial braking region in order to achieve the degressive behavior, e.g. by successively halving them, for example.

Provision is furthermore preferably made for the partial braking interval of the respective partial braking regions and/or the change in the actual ego deceleration between adjacent partial braking regions to be changed in order to achieve a degressive behavior of the actual jerk. To achieve a progressive change in the actual jerk in the respective partial braking regions, it is thus possible, in a flexible manner, to adapt both the temporal extent of a partial braking region and the constant change in the actual deceleration within a partial braking region.

Provision is furthermore preferably made for the vehicle to be braked or decelerated in such a way by bringing about the conditioning braking pulse that the actual ego deceleration of the vehicle reaches a limiting actual ego deceleration at least for a short time, wherein the limiting actual deceleration is preferably between 1 m/s$^2$ and 3 m/s$^2$, in particular between 1.7 m/s$^2$ and 2.7 m/s$^2$, and wherein the limiting actual deceleration is preferably chosen in a vehicle-specific manner. As a result, it is possible, by means of the conditioning braking pulse, to give the passengers the same feeling, which is decisively determined by the actual ego deceleration.

In particular, it is envisaged here that, to bring about the conditioning braking pulse, a vehicle-specific conditioning deceleration is specified as the setpoint ego deceleration of the vehicle, wherein the braking means of the respective braking system of the vehicle is actuated in a pulsed manner over a conditioning period with the conditioning deceleration specified for the specific vehicle, wherein the conditioning deceleration is, for example, between 1 m/s$^2$ and 3.5 m/s$^2$, in particular between 2.2 m/s$^2$ and 3.2 m/s$^2$, or it can be taken from a corresponding look-up table for a specific vehicle with a specific braking system or with corresponding braking means.

Vehicle-specific specification has the advantage that each vehicle reacts differently to a braking request since the respective braking system is configured differently. In order to generate a jerk with approximately the same feeling, a conditioning deceleration selected in a vehicle-specific manner must therefore be implemented by means of the braking system with the respective braking means in order to achieve the abovementioned limiting actual ego deceleration in each case. This also takes into account different dead times of the respective braking system or braking means, thus ensuring that identical conditioning decelerations do in fact always lead to approximately the same feeling for the passengers and that they can intuitively adjust to a braking process.

Provision is furthermore preferably made for the conditioning period to be dependent on an actual ego velocity of the vehicle and is preferably between 80 ms and 250 ms, in particular between 120 ms at less than 40 km/h and 170 ms at 80 km/h. This takes account of the fact that at relatively high actual ego velocities of the vehicle, the kinetic energy to be dissipated to obtain an identical jerk would be higher than at lower actual ego velocities of the vehicle. This is advantageous for achieving an almost identical feeling of a conditioning deceleration by the passengers.

Provision is furthermore preferably made, in the braking phase, for infinitesimal partial braking intervals to be selected, at least for some partial braking regions, with the result that the actual jerk is continuously differentiable or virtually continuous over the at least some partial braking regions. As a result, the braking process is carried out with as few perceptible abrupt changes in the actual ego deceleration as possible, which has a positive effect on the manageability of the situation and the safety of the passengers.

Provision is furthermore preferably made to ensure that, when a termination criterion is satisfied in a termination partial braking region, the conditioning braking pulse and/or the braking phase is/are terminated in a controlled manner by a reduction in the actual ego deceleration with a preferably constant termination jerk of, for example, −1.5 m/s$^3$, without the actual ego deceleration changing abruptly. As a result, for example, the driver can selectively terminate the automatically initiated braking process when the trigger criterion is present, if, for example, there is incorrect triggering and the driver has recognized this. However, the termination criterion can also be satisfied if the driving situation eases during the braking phase and it is automatically detected that the trigger criterion is no longer satisfied during a braking process. In order to continue to ensure the manageability of the driving situation for the passengers in the event of such a termination, no abrupt change in the actual ego deceleration takes place, even in the event of such a termination, until the ending of the braking phase.

Provision is furthermore preferably made for the actual ego deceleration in the braking phase to be set in such a way that the actual ego deceleration increases to a maximum deceleration. In this way, it is advantageously possible to define a vehicle-specific maximum deceleration for the braking process which is helpful for the passengers in the vehicle with regard to their safety and their ability to manage. With the method according to an embodiment of the invention, it is possible, for example, to achieve a maximum deceleration of approximately 3.5 m/s$^2$ and, at the same time, to ensure a high degree of manageability of the braking situation for the passengers and thus a high level of passenger safety.

In addition, provision can be made for the maximum deceleration to be selected as a function
of an actual transverse ego acceleration of the vehicle which is present when the braking phase is initiated in the vehicle, and/or of an actual transverse ego acceleration change of the vehicle which is present when the braking phase is initiated in the vehicle, and/or—of a predicted transverse ego acceleration of the vehicle, which is preferably estimated in advance as a function of a steering angular velocity and/or as a function of position data, advantageously in combination with map data and/or as a function of environmental data relating to the course of the roadway, which are detected by a sensor system, and/or of a predicted transverse ego acceleration change of the vehicle, which is preferably estimated in advance as a function of a steering angular velocity and/or as a function of position data, advantageously in combination with map data and/or as a function of environmental data relating to the course of the roadway, which are detected by a sensor system, and/or of a number of partial braking regions, and/or of the respective actual jerk in the at least two partial braking regions.

In this way, the maximum acceleration can be specifically matched to the parameterization of the method or the current driving dynamics. It is thereby possible, for example, to take account of the fact that, during cornering, the vehicle deceleration acts on the standing passenger in addition to the transverse acceleration. During cornering, the passenger is concerned with maintaining their equilibrium and, for this reason, can only correct for a deceleration of relatively small magnitude. In this case, provision can preferably also be made for the actual jerk in the respective partial braking region to be selected as a function of an actual transverse ego acceleration and/or the actual transverse ego acceleration change of the vehicle which is present when the braking phase is initiated in the vehicle. By this means too, improved manageability can be achieved.

Furthermore, in the case of a curve of the braking with a high number of partial braking regions, a higher maximum deceleration can be built up since the manageability of the braking intervention for the standing passenger is defined decisively by the actual jerk as a function of the current actual ego deceleration. It is thereby possible to adapt the actual jerk continuously and degressively as a function of the current actual ego deceleration. In addition, the change in the actual ego deceleration (actual jerk) also has an effect on manageability for the passengers, and therefore a greater maximum deceleration is possible while the manageability remains the same.

Alternatively or additionally, the maximum deceleration and/or the actual jerk in the respective partial braking regions can also be selected as a function of a safety period and/or a safety distance, the safety period being obtained from a difference between a predicted braking phase end time and a predicted event time and the safety distance from a predicted braking phase end position and a predicted event position. Here, the predicted braking phase end time is defined as the time at which the braking phase has ended, for example when the vehicle is at a standstill (standstill time) or after the braking phase has been terminated in a controlled manner when the termination criterion has been satisfied (termination time). The predicted braking phase end position is the position at which the vehicle is located at the braking phase end time.

The predicted event time and the predicted event position are dependent on the respective trigger criterion. Provision is preferably made for the trigger criterion to be satisfied if a determined collision probability of the vehicle with an object is above a predetermined limit value, or a predetermined trigger signal is present which indicates, for example, a red traffic light or a driver who is not fit to drive or a serious vehicle fault. Thus, a number of braking situations in which the method can be used are possible. Therefore, the method is not restricted to collision-avoiding braking situations.

Starting from this, the predicted event time is the time at which, on the basis of the triggering event, the vehicle will reach a predicted event position if the braking phase is carried out as planned. The predicted event position can be, for example, the position at which the vehicle would collide with the object or the latest position at which the vehicle should stop in front of a red traffic light. In this case, the respective predicted times or positions can be derived from predicted trajectories or from an analytical consideration of the driving dynamics of the vehicle or of the respective object.

If it is determined predictively during the braking phase that the safety period and/or the safety distance are above a respectively assigned limit value, then the maximum deceleration and/or the degressive curve of the actual jerk over the respective partial braking regions can be correspondingly adapted, in particular reduced. This avoids the acceptance of an unnecessarily high risk of injury to the passengers through a maximum deceleration or actual jerk which is set too high for the situation. The braking thus becomes more manageable, being adapted to the current driving situation.

Provision is furthermore preferably made for the actual ego deceleration of the vehicle in the braking phase to be reduced with a constant ramp-down jerk of, for example, $-1.5$ m/s$^3$ from a ramp-down time. It is thereby possible to ensure manageable stopping ("softstop"), wherein the ramp-down time is preferably chosen in such a way that, when the actual ego deceleration is reduced with the constant ramp-down jerk, the vehicle reaches a predetermined final actual ego deceleration of, for example, 1 m/s$^2$ at a standstill time immediately before the standstill of the vehicle. Accordingly, the system checks continuously in the braking phase in what partial braking region this ramp-down time lies, and the braking is "ramped down" in such a way as to stop in a controlled manner.

Here, the ramp-down time is preferably dependent on the actual ego velocity and/or the actual ego deceleration.

Provision is furthermore preferably made for acoustic and/or visual and/or haptic passenger signals for warning the passengers and/or object signals for warning objects in the environment to be emitted after the trigger criterion has been satisfied. It is thereby possible to warn the passengers of a braking phase as an addition to the conditioning braking pulse.

As a preferred option, it is envisaged that the vehicle is a road vehicle, for example a (scheduled) bus, which is suitable for transporting passengers who are standing and/or not strapped in. In this case, the vehicle preferably has an (electro)pneumatic braking system. In principle, however, other fluid-actuated and purely electrically actuated braking systems are also possible, which must be matched accordingly.

FIG. 1 schematically illustrates a vehicle 1 which serves to transport or carry passengers 2, the passengers 2 being standing passengers 2a and/or passengers 2b who are not strapped in. In this context, the vehicle 1 can be a road vehicle 1a, e.g. a bus 1b.

The vehicle 1 has a control unit 3 which is designed to actuate a braking system 4 and/or a transmission 5 of the vehicle 1. In this case, any system in the vehicle 1 which is capable of braking or decelerating the vehicle 1 in a controlled manner can be used as the braking system 4. For this purpose, the braking system 4 can have, for example, friction brakes 4b as a braking means, in particular as a component of an (electro)pneumatic braking system 4a, an engine brake, a recuperative brake (regenerative brake), a retarder, etc. Furthermore, an environment sensor system 6 is provided, by means of which an environment U around the vehicle 1 can be monitored. There can be objects O, for example persons P, other means of transport F, buildings G, etc., in the environment U. All these objects O represent possible collision objects with which the vehicle 1 can collide. In order to assess this, the control unit 3 can determine a collision probability W on the basis of ego driving dynamics D1 of the vehicle 1, e.g. an actual ego velocity vIst1 or an actual ego deceleration zIst1, etc., and object dynamics DO, i.e. an object velocity vO or an object acceleration aO, etc., and then generate a warning signal SW.

Figure 2:
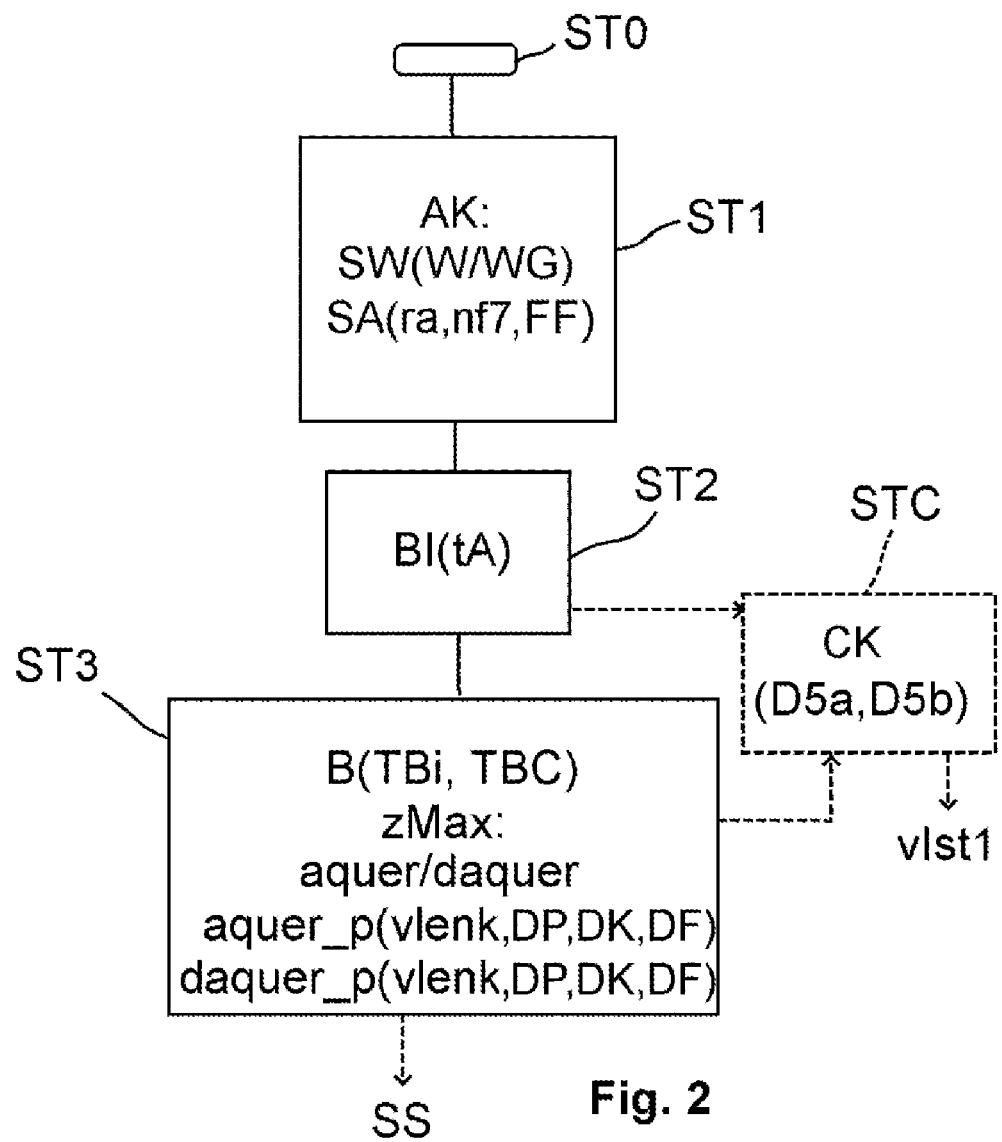
FIG. 2 shows a flowchart of a method according to an embodiment of the invention.

Furthermore, the control unit 3 is capable of controlling the braking system 4 and/or the drive system 5 in a method illustrated in FIG. 2 when a trigger criterion AK is satisfied. After an initialization step ST0, a check is made in a first step ST1 to determine whether the trigger criterion AK is satisfied.

The trigger criterion AK can be satisfied, for example, when a warning signal SW is present, which is automatically generated by the control unit 3 when a limit value WG for the collision probability W is exceeded and thereby indicates a possible collision in the future. In addition, the trigger criterion AK can also be satisfied by a trigger signal SA which is predetermined in an automated manner in some other way. The trigger signal SA can be generated or triggered, for example, when a red traffic light rA is detected or when a driver nf7 who is not fit to drive is detected or when a serious vehicle fault FF is detected.

In principle, the trigger criterion AK can also be satisfied when a driver 7 of the vehicle 1 manually requests a high setpoint ego deceleration zSoll1, for example on the basis of a manually initiated braking process for collision avoidance, and preferably no warning signal SW is present at the same time. However, this represents only an optional embodiment since the driver 7 should normally be given full control over the course of the braking process.

When the trigger criterion AK is satisfied, in a subsequent second step ST2, the control unit 3 brings about a conditioning braking pulse BI by means of the braking system 4 of the vehicle 1, for example by means of the friction brakes 4b, at a triggering time to (see FIG. 3), in order to brake the vehicle briefly or in a pulsed manner. This is intended to condition the passengers 2 of the vehicle 1 or to prepare them for the subsequent braking of the vehicle 1. The conditioning braking pulse BI thus serves mainly for conditioning the passengers 2, who thereupon tense their muscles and possibly also take a sidestep in order to increase their stability.

For this purpose, the conditioning braking pulse BI must be matched in terms of time and intensity in such a way that the passengers 2 can also perceive it, but that, at the same time, it is harmless to the passengers 2, that is to say that they do not fall as a result under normal conditions. This can be achieved if the actual ego deceleration zIst1 of the vehicle 1 within a conditioning period dK reaches or exceeds a predetermined limiting actual ego deceleration zIstG of at least 1.7 m/s$^2$, at least for a short time (see FIG. 3a). This is normally sufficient to achieve a certain perception on the part of the passengers 2 and thus to prepare them for the braking situation.

Since, depending on equipment, each vehicle 1 triggers a different effect on the passengers 2, the limiting actual ego deceleration zIstG must be chosen in a vehicle-specific manner. However, in order to avoid the passengers 2 falling over, the limiting actual ego deceleration zIstG during the conditioning braking pulse BI should also not be chosen to be too high, for example between 1 m/s$^2$ and approximately 3 m/s$^2$.

Figure 3A:
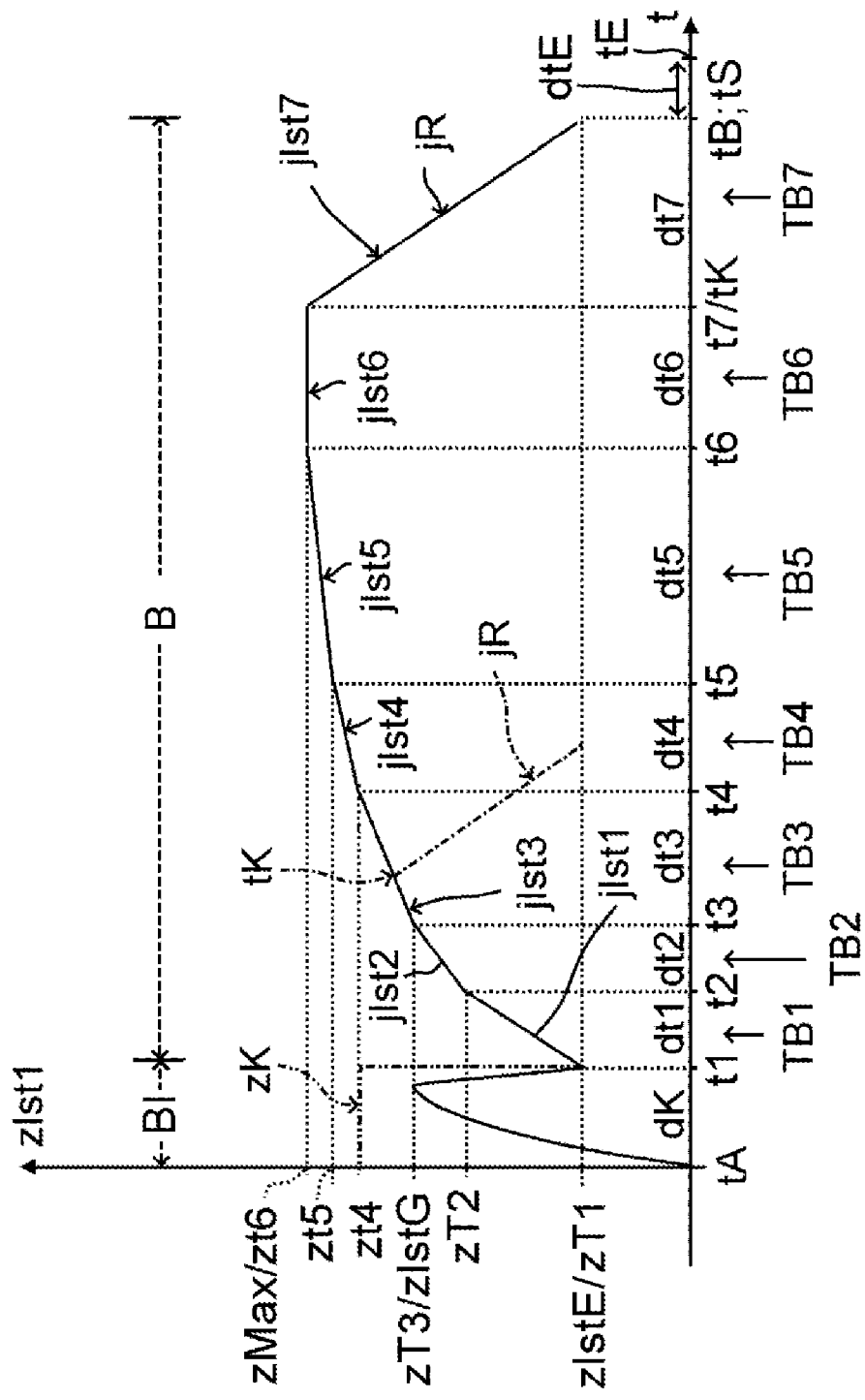
FIGS. 3a and 3b show time curves of braking operations which are carried out in accordance with a method according to an embodiment of the invention.

Such a conditioning braking pulse BI for bringing about the limiting actual ego deceleration zIstG, at least for a short time, is generated here by a pulse-like request for a defined conditioning deceleration zK as the setpoint ego deceleration zSoll1 of the vehicle 1 within the conditioning period dK (see FIG. 3a). Owing to different designs of braking systems 4 and different reactions of a vehicle 1 to a specific requested setpoint ego deceleration zSoll1, the conditioning deceleration zK should be chosen in a vehicle-specific manner. For example, the brakes of an electropneumatic braking system 4a in a bus 1b can be activated with a conditioning deceleration zK of 3 m/s$^2$ over a conditioning period dK of between 120 ms and 170 ms in order to achieve a limiting actual ego deceleration zIstG of, for example, 2.5 m/s$^2$ at least for a short time and in this way to condition the passengers 2.

The conditioning period dK can advantageously be chosen as a function of the actual ego velocity vIst1 of the vehicle 1. This results from the fact that the request for a certain setpoint ego deceleration zSoll1 or the conditioning deceleration zK causes a different effect on the passengers 2 in the vehicle 1, depending on the actual ego velocity vIst1 of the vehicle 1. This is due to the fact that, at relatively high actual ego velocities vIst1 of the vehicle 1, the kinetic energy to be dissipated to obtain an identical jerk as a result of the conditioning braking pulse BI would be higher than at lower actual ego velocities vIst1 of the vehicle 1. Given the specification of a defined conditioning deceleration zK, the limiting actual ego deceleration zIstG is therefore only reached later in the case of a faster vehicle 1, and therefore the conditioning period dK chosen in order to produce braking of the vehicle 2 that is clearly perceptible to the passengers 2 must be correspondingly greater than in the case of a slower vehicle 1. This is advantageous for achieving an almost identical feeling of a conditioning deceleration zK by the passengers 2.

For example, at an actual ego velocity vIst1 of less than 40 km/h, a conditioning period dK of 120 ms can be chosen, and at 80 km/h, a conditioning period dK of 170 ms. In the case of other fluid-actuated braking systems with different deceleration behavior, the conditioning period dK and also the conditioning deceleration zK must be adapted accordingly.

After the generation of the conditioning braking pulse BI at the triggering time tA, a braking phase B is initiated in a third step ST3. In this phase, the vehicle 1 is preferably braked to a standstill SS, unless the braking phase B is prematurely terminated in a controlled manner in the presence of a termination criterion CK.

The braking of the vehicle 1 in the braking phase B normally takes place in different partial braking regions TBi, where i=1, 2, 3, . . . N, wherein the number N of partial braking regions TBi can be predetermined and is at least two. Here, the different partial braking regions TBi differ in the time curve of the actual ego deceleration zIst1 which occurs, the actual ego deceleration zIst1 being dependent on different factors. This is illustrated in more detail below with reference to two examples in FIG. 3a and FIG. 3b:

In FIG. 3a, by way of example, a first partial braking deceleration zT1 of, for example, 1 m/s² is set as the actual ego deceleration zIst1 of the vehicle 1 in a first partial braking region TB1 at a first partial braking time t1. Here, the first partial braking time t1 is chosen in such a way that the first partial braking deceleration zT1 lies on the falling flank of the conditioning braking pulse BI. The conditioning braking pulse BI thus merges directly into the first partial braking region TB1 without an abrupt or sudden rise in the actual ego deceleration zIst1.

The actual ego deceleration zIst1 is increased continuously from there, within the first partial braking region TB1, up to a second partial braking time t2, to a second partial braking deceleration zT2 of 2 m/s². This takes place within a first partial braking interval dt1 of approximately 800 ms. This results in a certain first actual jerk jIst1 (gradient of the actual ego deceleration zIst1 in the first partial braking region TB1) for the first partial braking region TB1.

In a subsequent second partial braking region TB2, a smaller second actual jerk jIst2 is set in that the actual ego deceleration zIst1 is increased continuously, from the second partial braking time t2 to a third partial braking time t3, to a third partial braking deceleration zT3 of approximately 2.5 m/s². A second partial braking interval dt2 (t2 to t3) is, for example, likewise set to 800 ms, with the result that the first actual jerk jIst1=1.25 m/s³ for the first partial braking region TB1 is greater than the second actual jerk jIst2=0.625 m/s³ for the second partial braking region TB2. It is possible here in principle to specify that the actual jerk jIst1 within the braking phase B does not exceed a value of 2 m/s³, preferably 1.5 m/s³, in particular 1.25 m/s³, in order to allow braking which is safe and manageable for the passengers 2.

Subsequently, further partial braking regions TB3, TB4, TB5 with the respective actual jerk jIst3, jIst4, jIst5 follow, these following from rises to a fourth partial braking deceleration zT4 of 3.0 m/s² within a third partial braking interval dt3 of 1600 ms, to a fifth partial braking deceleration zT5 of 3.2 m/s² within a fourth partial braking interval dt4 of 900 ms and to a sixth partial braking deceleration zT6 of 3.5 m/s² within a fifth partial braking interval dt5 of 2200 ms. According to this exemplary embodiment, the sixth partial braking deceleration zT6 corresponds to a maximum deceleration zMax of the vehicle 1.

This results in degressive behavior with respect to the actual jerk jIst1 during the braking phase B, wherein the first actual jerk jIst1 is highest after the conditioning braking pulse BI. Passengers 2 thus feel the greatest change in the actual ego deceleration zIst1 of the vehicle 1 in the first partial braking region TB1.

In a subsequent sixth partial braking region TB6, the actual ego deceleration zIst1 is kept constant at the sixth partial braking deceleration zT6 or, in this case, the maximum deceleration zMax up to a seventh partial braking time t7. Accordingly, the sixth actual jerk jIst6 is zero, and therefore the degressive behavior is also continued in the sixth partial braking region TB6. In this embodiment, the seventh partial braking time t7 is defined as follows:

During the entire braking phase B, the system checks from which ramp-down time tR the actual ego deceleration zIst1 of the vehicle 1 is to be reduced in order, with a constant ramp-down jerk jR of, for example, −1.5 m/s³, to achieve a final actual ego deceleration zIstE of, for example, 1 m/s² at a standstill time tS at or shortly before the standstill SS of the vehicle 1. In the case shown in FIG. 3a, where a maximum deceleration zMax of 3.5 m/s² is achieved in the sixth partial braking region TB6, the ramp-down time tR for reducing the actual ego deceleration zIst1 is satisfied at the seventh partial braking time t7 if the actual vehicle velocity vIst1 is at a limiting actual ego velocity of the vehicle 1 of approximately 23 km/h.

Since the reduction of the actual ego deceleration zIst1 with the ramp-down jerk jR is coupled to the current actual ego deceleration zIst1 and also to the current actual ego velocity vIst1 of the vehicle 1, the ramp-down time tR for reducing the actual ego deceleration zIst1 to the final actual ego deceleration zIstE can basically also be in one of the previous partial braking regions TBi even before the maximum deceleration zMax is reached (dash-dotted line in FIG. 3a in the third partial braking region TB3). Accordingly, the number N of partial braking regions TBi can be reduced in the case of braking processes at low actual velocities vIst as compared with braking processes at higher actual velocities vIst.

A stop ("soft stop") of the vehicle 1 which is manageable for the passengers 2 can be ensured by means of the ramp-down jerk jR since an abrupt change in the actual ego deceleration zIst1 when the standstill SS is reached is avoided. Thus, the passengers 2 can adjust to this, and therefore the reaching of the standstill SS is likewise manageable.

From the seventh partial braking time t7, the actual ego deceleration zIst1 in a seventh partial braking region TB7 is thus continuously reduced with a seventh actual jerk jIst7, which corresponds to the ramp-down jerk jR, i.e. the seventh actual jerk jIst7 is negative.

Here, therefore, the actual ego deceleration zIst1 is set in seven partial braking regions TBi in such a way that the passengers 2 can adjust to this and can also compensate for the respective deceleration requirements in order to minimize the risk of falling. For this purpose, continuous braking is carried out without step changes or abrupt changes in the actual ego deceleration zIst1. As a result, the braking process is more manageable and therefore safer overall for the passengers 2 since the braking is less abrupt.

With this method, it is possible in principle to select a maximum deceleration zMax which is higher than in the normal case. A braking process at an actual ego velocity vIst1 of 80 km/h in which the deceleration is ramped up to a maximum deceleration zMax of, for example, 3.2 m/s² in a plurality of partial braking regions TBi can then be better managed by a passenger 2 than a braking process with a maximum deceleration zMax of 2 m/s² which has step changes in the actual ego deceleration zIst1, this having a negative effect on manageability.

In this case, the number N of partial braking regions TBi can be increased as desired and thus the partial braking intervals dti and/or the respective partial braking decelerations zTi can be adapted accordingly in order, with infinitesimally small partial braking intervals dti, to achieve a continuously falling (degressive) curve of the actual jerk jIst1 over the respective partial braking regions TBi with a sign change during the ramp-down jerk jR until the standstill SS is reached. In this way, manageability by the passengers can be further increased.

Here, the maximum deceleration zMax and/or the respective actual jerk jIst1 in the respective partial braking region TBi can additionally be selected as a function of an actual transverse ego acceleration aquer and/or an actual transverse ego acceleration change daquer of the vehicle 1 which is present when the braking phase B is initiated in the vehicle 1. The underlying explanation is that, during cornering for example, the passenger 2, who is, for example, standing, is acted upon by the actual ego deceleration zIst1, which according to the an embodiment of invention is specified in the direction of travel FR of the vehicle 1, in addition to the actual transverse ego acceleration aquer. During cornering, the passenger is concerned with maintaining their equilibrium and, for this reason, can only correct for an actual ego deceleration zIst1 of relatively small magnitude in the direction of travel FR of the vehicle 1.

The actual transverse ego acceleration aquer or the actual transverse ego acceleration change daquer can be estimated from a steering wheel angle, a transmission ratio of the transmission 5, steering kinematics, a wheel base and the actual transverse velocity vIst for level travel, for example, but it can also be measured by means of a corresponding transverse acceleration sensor.

In addition, it is possible, instead of the actual transverse ego acceleration aquer, to determine a predicted transverse ego acceleration aquer_p or a predicted transverse ego acceleration change daquer_p, e.g. on the basis of a steering angular velocity vlenk or on the basis of position data DP, for example from route data and/or from map data KD and/or from roadway course data DF detected by a sensor system. In this case, GPS-based path planning and thus the future transverse ego acceleration can be estimated from the position data DP.

In addition, the maximum deceleration zMax and/or the respective actual jerk jIst1 in the respective partial braking regions TBi can also be selected as a function of a safety period dtE (see FIG. 3a) and/or a safety distance AE (see FIG. 1). Here, the safety period dtE can be obtained from a difference between a predicted braking phase end time tB (termination time tC or standstill time tS, see FIGS. 3a, 3b), that is to say the time at which the braking phase B has ended, and a predicted event time tE. The safety distance AE is correspondingly obtained from a predicted braking phase end position PB and a predicted event position PE. The predicted braking phase end position PB is the position at which the vehicle 1 is located at the braking phase end time tB.

Starting from the trigger criterion AK, the predicted event time tE is the time t at which, on the basis of the triggering event, the vehicle 1 will reach a predicted event position PE if the braking phase B is carried out in the pre-planned manner. The predicted event position PE can therefore be, for example, the position at which the vehicle 1 would collide with the object O or the latest position at which the vehicle 1 should stop in front of a red traffic light rA. In this case, the respective predicted times or positions can be derived from predicted trajectories or from an analytical consideration of the driving dynamics D1, DO of the vehicle 1 or of the respective object O.

If it is determined predictively during the braking phase B that the safety period dtE and/or the safety distance AE are above a respectively assigned limit value, then the maximum deceleration zMax and/or the degressive curve of the actual jerk jIst1 over the respective partial braking regions TBi can be correspondingly adapted, in particular reduced. This avoids the acceptance of an unnecessarily high risk of injury to the passengers 2 through a maximum deceleration zMax or actual jerk iIsti which is set too high for the situation.

In addition, provision can be made for the avoidance of other unmanageable deceleration interventions by braking means of the respective braking system 4. For this purpose, when the trigger criterion AK is satisfied in the braking phase B or even already during the conditioning braking pulse BI, a transmission 5 of the vehicle 1 can be disengaged, ensuring that no torque DM is transmitted between an input drive train 5a of the vehicle 1 and an output drive train 5b of the vehicle 1, or a non-positive connection is interrupted. As a result, sudden changes in the actual ego deceleration zIst1, e.g. due to the intervention of the engine brake or the drag torque of the engine during the velocity reduction in the braking phase B, are avoided exclusively by means of the friction brakes 4b. This could lead to an unnecessary abrupt change in the actual ego deceleration zIst1 and thus to unmanageable swaying by the passengers 2, who cannot adjust to this. This could cause them to fall during the braking maneuver in the braking phase B. This risk increases drastically if the shift phases of the transmission 5 take place at a high actual ego deceleration zIst1.

However, even when other braking means are used, for example a recuperation brake, provision can advantageously be made for activation of some other braking means of the vehicle 1 to be suppressed in order to avoid unmanageable, abrupt influences on the actual ego deceleration zIst1.

In addition, any other external braking requests (XBR) are advantageously also suppressed, ensuring that the vehicle 1 is also not decelerated abruptly in the braking phase B in an uncontrolled manner by further braking means, for example a retarder, and thus an unwanted change in the actual deceleration zIst1 in the braking phase B is avoided.

It is furthermore possible to check, during the braking phase B or even already during the conditioning braking pulse BI, whether a termination criterion CK for the braking is satisfied (see FIG. 2). This may be the case, for example, if the driver detects incorrect fulfillment of the trigger criterion AK and intervenes manually by pressing the accelerator pedal. Furthermore, the driver can also intensify the braking manually if he himself has recognized an emergency situation and wants to brake the vehicle 1 as quickly as possible under manual control. Even then, the termination criterion CK can be satisfied. However, the termination criterion CK can also be satisfied if the driving situation eases during the braking phase B and it is automatically detected that the trigger criterion AK is no longer satisfied during a braking process.

Figure 3B:
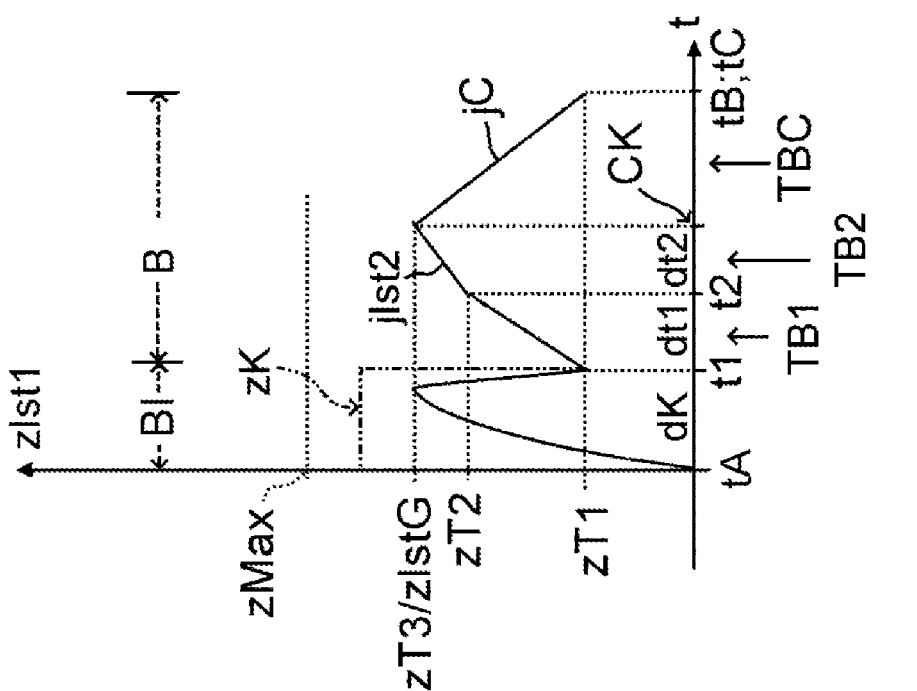

If the termination criterion CK is present, for example owing to incorrect fulfillment of the trigger criterion AK or the trigger criterion AK no longer being fulfilled, the braking phase B or the conditioning braking pulse BI is terminated in a controlled manner in a termination step STC, according to FIG. 3b, for example, already after the second partial braking region TB2. Here too, the concept of the invention of keeping the manageability of the braking process for the passengers 2 as high as possible by not permitting any abrupt changes in the actual ego deceleration zIst is followed.

For this purpose, when the termination criterion CK is satisfied as shown in FIG. 3b, the actual ego deceleration zIst1 is reduced continuously in a termination partial braking region TBC. This can be accomplished, for example, similarly to the seventh partial braking region TB7 in FIG. 3a, by means of a corresponding termination jerk jA of, for example, $-1.5 \text{ m/s}^3$, with which the actual ego deceleration zIst1 present when the termination criterion CK is satisfied is reduced continuously up to a termination time tC.

In the termination partial braking region TBC of the braking phase B too, the transmission 5 of the vehicle 1 initially remains disengaged, ensuring that no torque DM is transmitted between the input drive train 5a of the vehicle 1 and the output drive train 5b of the vehicle 1, or a non-positive connection is interrupted. The transmission 5 is not engaged until it is determined that a rotational speed D5a of the input drive train 5a corresponds approximately to a rotational speed D5b of the output drive train 5b, thus ensuring that no abrupt change in the actual ego deceleration zIst1 occurs as a result of the engagement.

As an accompanying measure, it is possible, when the trigger criterion AK is satisfied in the braking phase B or even already during the conditioning braking pulse BI, to emit acoustic and/or visual and/or haptic (vibration of the seats) passenger signals SP and/or object signals SO to the objects O in the environment U.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

1 vehicle
1a road vehicle
1b bus
2 passenger
2a standing passenger
2b passenger who is not strapped in
3 control unit
4 braking system
4a pneumatic braking system
5 transmission
5a input drive train
5b output drive train
6 environment sensor system
7 driver
aO object acceleration
aquer actual transverse ego acceleration
aquer_p predicted transverse ego acceleration
AE safety distance
AKtrigger criterion
B braking phase
BI conditioning braking pulse
CK termination criterion
daquer actual transverse ego acceleration change
daquer_p predicted transverse ego acceleration change
dK conditioning period
dtE safety period
dti $i^{th}$ partial braking interval
D1 ego driving dynamics
D5a rotational speed of input drive train 5a
D5b rotational speed of output drive train 5b
DF roadway course data
DKmap data
DM torque
DO object dynamics
DP position data
F means of transport
FF vehicle fault
FR direction of travel
G building
i index
jC termination jerk
jIsti $i^{th}$ actual jerk
jR ramp-down jerk
nf7 driver not fit to drive
N number of partial braking regions TBi, TBC
O object
P person
PB predicted braking phase end position
PE predicted event position
Q proportion
rA red traffic light
SA activation signal
SO object signal
SP passenger signal
SS standstill
SW warning signal
t1, t2, t7 first, second, . . . , seventh partial braking time
tA trigger time
tB predicted braking phase end time
tE predicted event time
tR ramp-down time
tS standstill time
TBi partial braking region
TBC termination partial braking region
U environment
vIst1 actual ego velocity
vIstG limiting actual ego velocity
vlenk steering angular velocity
vO object velocity
W collision probability
WG limit value
zIst1 actual ego deceleration
zIstE final actual ego deceleration
zIstG limiting actual ego deceleration
zMax maximum deceleration
zK conditioning deceleration
zSoll1 setpoint ego deceleration
zT1, zT2, zT7 first, second, . . . , seventh partial braking deceleration
ST0, ST1, ST2, ST3, STC steps of the method

The invention claimed is:

1. A method for braking a vehicle for carrying passengers, comprising:
checking whether a trigger criterion for braking the vehicle for carrying passengers is present; and
if the trigger criterion is satisfied, causing a conditioning braking pulse through pulsed braking of the vehicle configured to cause a predetermined magnitude of deceleration of the vehicle, and immediately thereafter initiating a braking phase,
wherein, in the braking phase, the vehicle is braked using a braking system in at least two partial braking regions by an actual ego deceleration that varies with respect to time, wherein each partial braking region is extended over a partial braking interval, wherein the partial braking regions merge into one another without the actual ego deceleration changing such that an actual jerk of the vehicle is less than 2 m/s³, and the actual ego deceleration in at least one of the partial braking regions is changed continuously over the respective partial braking interval such that a different actual jerk is obtained in each partial braking region, and wherein the actual jerk behaves degressively over at least some partial braking regions of the braking phase.

2. The method as claimed in claim 1, wherein the actual ego deceleration in a respective partial braking region is set such that the actual jerk behaves degressively over all the partial braking regions of the braking phase.

3. The method as claimed in claim 1, wherein the actual ego deceleration in at least some partial braking regions of the braking phase is set such that the actual jerk of a subsequent partial braking region corresponds to a proportion of the actual jerk) of the immediately preceding partial braking region), wherein the proportion is between 0.4 and 0.6.

4. The method as claimed in claim 1, wherein the actual jerk after the causing of the conditioning braking pulse and/or at least in the braking phase is less than 1.7 m/s³.

5. The method as claimed in claim 1, wherein the partial braking interval of the respective partial braking regions and/or a change in the actual ego deceleration between adjacent partial braking regions is changed to achieve a degressive behavior of the actual jerk.

6. The method as claimed in claim 2, wherein the vehicle is braked such that the actual ego deceleration of the vehicle reaches a limiting actual ego deceleration, wherein the limiting actual ego deceleration is between 1 m/s² and 3 m/s².

7. The method as claimed in claim 1, comprising specifying a vehicle-specific conditioning deceleration as the setpoint ego deceleration of the vehicle to cause the conditioning braking pulse, wherein the braking system of the vehicle is actuated in a pulsed manner over a conditioning period with the conditioning deceleration specified for the specific vehicle, and wherein the conditioning deceleration is between 1 m/s² and 3 m/s².

8. The method as claimed in claim 7, wherein the conditioning period is dependent on an actual ego velocity of the vehicle and is between 80 ms and 250 ms.

9. The method as claimed in claim 1, wherein, in the braking phase, infinitesimal partial braking intervals are selected, at least for some partial braking regions, such that the actual jerk is constant over the at least some partial braking regions.

10. The method as claimed in claim 1, wherein the vehicle is braked only by friction brakes of the braking system of the vehicle, at least in the braking phase.

11. The method as claimed in claim 10, wherein no torque is transmitted between an input drive train of the vehicle and an output drive train of the vehicle, at least in the braking phase, and/or wherein a transmission of the vehicle is disengaged to interrupt a non-positive connection.

12. The method as claimed in claim 11, wherein, when a termination criterion is satisfied in a termination partial braking region, the conditioning braking pulse and/or the braking phase is/are terminated in a controlled manner by a reduction in the actual ego deceleration with a constant termination jerk, without the actual ego deceleration changing such that the actual jerk of the vehicle is less than 2 m/s³.

13. The method as claimed in claim 12, wherein coupling of the transmission when the termination criterion is satisfied in the termination partial braking region is not performed until it is determined that a rotational speed of the input drive train corresponds approximately to a rotational speed of the output drive train in order to prevent the actual ego deceleration from changing such that the actual jerk of the vehicle is less than 2 m/s³.

14. The method as claimed in claim 1, wherein the actual ego deceleration in the braking phase is set such that the actual ego deceleration increases to a maximum deceleration.

15. The method as claimed in claim 14, wherein the maximum deceleration and/or the respective actual jerk in the respective partial braking region are/is chosen and/or adapted in accordance with at least one parameter selected from the group consisting of:

an actual transverse ego acceleration of the vehicle which is present when the braking phase is initiated in the vehicle, an actual transverse ego acceleration change of the vehicle which is present when the braking phase is initiated in the vehicle, a predicted transverse ego acceleration of the vehicle, a predicted transverse ego acceleration change of the vehicle, a number of partial braking regions, the respective actual jerk in the at least two partial braking regions, a safety period, wherein the safety period is obtained from a difference between a predicted braking phase end time and a predicted event time, and a safety distance, wherein the safety distance is obtained from a difference between a predicted braking phase end position and a predicted event position.

16. The method as claimed in claim 15, wherein the predicted transverse ego acceleration of the vehicle and/or the predicted transverse ego acceleration change of the vehicle are/is estimated as a function of a steering angular velocity and/or as a function of position data of the vehicle.

17. The method as claimed in claim 1, wherein the actual ego deceleration of the vehicle in the braking phase is reduced with a constant ramp-down jerk of −1.5 m/s³ from a ramp-down time.

18. The method as claimed in claim 17, wherein the ramp-down time is chosen such that, when the actual ego deceleration is reduced with the constant ramp-down jerk, the vehicle reaches a predetermined final actual ego deceleration of 1 m/s² at a standstill time immediately before a standstill of the vehicle.

19. The method as claimed in claim 17, wherein the ramp-down time is dependent on the actual ego velocity and/or the actual ego deceleration.

20. The method as claimed in any claim 1, wherein the trigger criterion is satisfied if:

a determined collision probability of the vehicle with an object is above a predetermined limit value, or a predetermined trigger signal is present which indicates a red traffic light or a vehicle fault.

21. The method as claimed in claim 1, wherein the actual ego deceleration does not change such that the actual jerk of the vehicle is less than 2 m/s³ between the conditioning braking pulse and the braking phase, and wherein the conditioning braking pulse merges directly into the braking phase in the case of the actual ego deceleration being between 0.1 m/s² and 2 m/s².

22. A control unit for carrying out the method as claimed in claim 1.

23. A vehicle the control unit as claimed in claim 22, wherein the vehicle is configured to carry passengers who are standing and/or not strapped into a seat of the vehicle, wherein the vehicle is a road vehicle, and wherein the vehicle has a pneumatic braking system.

* * * * *